3,780,126
OXIDATIVE DEHYDROGENATION IN THE PRESENCE OF CRYSTALLINE, PROVOSKITE TYPE MANGANESE COMPOUNDS
Harold E. Manning, Houston, Tex., assignor to Petro-Tex Chemical Corporation, Houston, Tex.
No Drawing. Continuation-in-part of abandoned application Ser. No. 743,600, July 10, 1968. This application Mar. 26, 1971, Ser. No. 128,540
Int. Cl. C07c 5/18
U.S. Cl. 260—680 D          10 Claims

ABSTRACT OF THE DISCLOSURE

Process for the oxidative dehydrogenation of dehydrogenatable organic compounds by heating the compounds with oxygen (and optionally halogen) in the presence of a solid crystalline catalyst containing manganese and at least two other metals, one of which is a light metal having an oxidation state of 1+ or 2+. Manganese compounds of the perovskite structure are preferred catalysts.

---

This application is a continuation-in-part of application Ser. No. 743,600 filed July 10, 1968 and now abandoned.

This invention relates to a process for the dehydrogenation of organic compounds at elevated temperatures in the presence of specified catalytic materials.

It is well known that organic compounds, for example, hydrocarbons, may be dehydrogenated in the presence of various catalysts by the use of elevated temperatures. Among the compounds around which much of the work has been centered are the hydrocarbons of 2 to 20 carbon atoms. In particular, considerable attention has centered around the dehydrogenation of saturated hydrocarbons, monoolefins, and diolefins of 4 to 6 carbon atoms. One typical process involves the dehydrogenation of the organic compound in the vapor phase at elevated temperatures in the presence of oxygen, halogen and various contact catalysts. Another process for dehydrogenating hydrocarbons involves the presence of oxygen and a given catalyst, in the absence of halogen. In the past, the particular catalyst employed in these dehydrogeneration systems depended to some extent on the feedstock which was dehydrogenated, and the presence or absence of halogen.

It has now been found that a large variety of dehydrogenatable organic compounds, for example, organic compounds containing at least one pair of adjacent carbon atoms, each of which possesses at least one hydrogen atom, may be dehydrogenated by contacting these materials in the presence of oxygen at elevated temperatures, in the presence or absence of halogen, with a catalyst containing manganese and other elements in specified proportions.

In general, the catalyst employed in the process of this invention are solid crystalline compositions of manganese, oxygen, and at least two other metallic elements, one of which is a specified light metal. More particularly, solid crystalline composition containing manganese wherein manganese is combined with oxygen and at least two additional metallic elements, at least one of which is a light metal having an oxidation state of 1+ or 2+, are suitable. Included within the concept of the invention is that class of manganese compounds which is of the perovskite structure.

The ideal perovskite structure is cubic, however, very few compounds have this ideal structure. The term perovskite structure draws its name from the mineral perovskite ($CaTiO_3$) which was first thought to have cubic structure but has now been determined to be orthorhombic. For example, the compound $LaMnO_3$ has the ideal structure while complex oxides such as $La_0.Sr_{0.3}MnO_3$ will exhibit a variety of other structures. Nonetheless such distorted structures are still classed as perovskite type structures. A more complete discussion of the perovskite type structure, its permutations and variations is found in Structural Inorganic Chemistry, A. F. Wells, third edition, Oxford, the Clarendon Press, 1962, pages 494 to 499.

For convenience, the additional two metallic elements of the invention will be referred to as the second and third metallic elements. The second and third metallic elements may be varied considerably except, as noted, that one of the second or third metallic elements should be a light metal (or mixtures thereof) having an oxidation state of 1+ or 2+. This group of metallic elements includes Na, Li, K, Rb, Cs, Be, Mg, Ca, Sr, and Ba. The preferred Mn catalysts include a metal selected from the group comprising Sr Ba, and Ca, or mixtures thereof. The remaining metallic element may be selected from a considerable number of elements other than those mentioned, and mixtures thereof, the only limitation being that the ionic radii of the remaining metallic element or elements is small enough that the oxygen anions present in the crystal lattice are not spread too far apart in the crystal structure. That is, the elements must be able to form a crystalline structure with the Mn and the oxygen. In general, so as to not preclude proper crystalline structure formation, the remaining metallic element or elements should have ionic radii not in excess of about 1.35 angstroms. Excluding the light metals, having an oxidation state of 1+ or 2+, and Mn, this grouping of elements includes Mg, Cu, Ag, Co, Ni, Ru, Rh, Pd, Os, Ir Pt, the metals of Group IIIb including the Lanthanide Rare Earth metals the metals of Groups IIb, IVb of the Periodic Table [1] and Pb, Bi, and Sb.

The total number of atoms of the second and third metallic ingredients should preferably be from about 0.53 to about 3.0 atoms per atom of Mn and preferably will be from or about 0.60 to about 2.5 total atoms per atom of Mn, with a particularly preferred ratio of about 0.8 to about 2.0 total atoms per atom of Mn. Oxygen should preferably be present in a ratio of about 3 or 4 atoms per atom of Mn, although up to 6 atoms or more per atom of Mn may be employed.

It will be understood by those of skill in the art that it is not essential that the catalytic compositions of the invention contain oxygen initially. What is necessary, however, is that the compositions contain oxygen during the reaction; that is to say, the compositions during the reaction contain oxygen or are converted to materials containing oxygen in the crystal structure. Thus, such materials as carbonates, hydroxides, nitrates, nitrites, and acetates may be employed in the manufacture of the catalytic compositions.

Portions of the manganese in the catalyst may be replaced by such metals as Co, Cr, Ti, Nb, Ta, and Zr and combinations thereof, as long as sufficient manganese and the other two metallic elements are present, i.e., catalytic amounts, to provide catalytic cavity. Amounts of up to and including 50 percent of the manganese in the crystal structure may be replaced by one or a combination of these metals, with from 0 to 30 percent a preferred range.

The compositions do not have sharp X-ray diffraction reflection peaks as would be found, e.g., in a highly crystalline material having the same chemical composition. Instead, the compositions of this invention exhibit reflection peaks which are relatively broad. The degree of sharpness of the reflection peak may be measured by the reflection peak band width at half height (W h/2). In

---

[1] Handbook of Chemistry and Physics, 45th edition, 1964–1965, The Chemical Rubber Co., Cleveland, 1964, page B-2.

other words, the width of the reflection peak as measured at one-half of the distance to the top of the peak is the "band width at half height." The band width at half height is measured in units of ° theta. Techniques for measuring the band widths are discussed, e.g., in Chapter 9 of Klug and Alexander, X-ray Diffraction Procedures, John Wiley and Son, N.Y., 1954. The observed band widths at half height of the preferred compositions of this invention are at least 0.16 ° 2 theta and normally will be at least 0.20 ° 2 theta.[2]

The preferred Mn catalysts are those of the perovskite structure and which, as noted, contain in addition to oxygen, at least two metallic elements, one of which is selected from the group comprising Sr, Ba, Ca. Quite suitable catalysts are those described by the formula $$Me_{(1-x)}Q_xMn_{(1-r)}A_rO_y$$

wherein Me represents metals, and mixtures thereof, excluding Fe, Ca, Sr, Ba and Mn, whose cations have ionic radii less than about 1.35A., Q is a cation selected from the group comprising Sr, Ca, Ba, and mixtures thereof, A represents a metal selected from the group comprising Co, V, Cr, Ti, Nb, Ta, Zr, and mixtures thereof, $x$ is a number between 0.05 and 0.55, $r$ is a number between 0 and 0.50, and $y$ is a number from 3 to 6. Preferred metals as Me are the elements of Group IIIb, including the Lanthanide Rare Earth elements, Na, K, Li, Co, Ni, Co, Ni, Cu, Zn, Cd, Ag, Sn, Sb, Pb, Bi, Ti, Zr, Hf, Ta, Nb, the metals of Group VIb, and mixtures thereof. The cations of the elements Na, K, Cr, Cu, Mg, Ni, Zn, Pb, Zr, and mixtures thereof may be used, with the cations of the elements La, Ce, Y, Co, Bi and mixtures thereof being most preferred. As has been noted, portions of the Mn present may be replaced by minor amounts of various metallic ions such as Co and V. The preferred substituting ion for Mn is that of Vanadium.

Examples of catalysts which may be used in the present invention are $La_{0.7}Ca_{0.3}MnO_3$; $Nd_{0.8}Ba_{0.2}MnO_3$; $Mg_{0.6}Ba_{0.4}MnO_3$; $Sm_{0.7}Ca_{0.3}Mn_{0.8}Cr_{0.2}O_3$; and $Ce_{0.7}Sr_{0.3}Mn_{0.7}V_{0.3}O_3$. Also suitable are $Pr_{0.7}Sr_{0.3}Mn_{0.5}Co_{0.5}O_3$; $Y_{0.4}K_{0.5}Ca_{0.1}Mn_{0.9}Nb_{0.1}O_3$; $La_{0.7}Ba_{0.3}Mn_{0.7}Ti_{0.3}O_3$; and $$Ce_{0.5}Ba_{0.5}MnO_3$$

The process of this invention can be applied to a multitude of dehydrogenatable organic compounds to obtain the corresponding unsaturated derivative thereof. The organic compounds normally will contain from 2 to 20 carbon atoms, at least one $$\begin{array}{c} H\ H \\ |\ \ | \\ -C-C- \\ |\ \ | \end{array}$$

grouping, that is, adjacent carbon atoms each containing at least one hydrogen atom, and will have a boiling point below about 350° C. Those compounds may contain in addition to carbon and hydrogen, such elements as oxygen, the halogens, nitrogen and sulphur. Preferred are compounds having from 2 to 12 carbon atoms, and especially preferred are compounds of 3 to 6 or 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. The product of the dehydrogenation is an unsaturated compound produced by the dehydrogenation of the $$\begin{array}{c} H\ H \\ |\ \ | \\ -C-C- \\ |\ \ | \end{array}$$

group, thus producing an ethylenic unsaturation. There can be still further dehydrogenation of such ethylenic groups, in some instances, to acetylenic groups. Illustration of dehydrogenations include propionitrile to acrylonitrile, propionaldehyde to acrolein, ethyl chloride to vinyl chloride, methyl isobutyrate to methyl methacrylate, 2 or 3 chlorobutene-1 or 2, 3 dichlorobutane to chloroprene, ethyl pyridine to vinyl pyridine, ethylbenzene to styrene, isopropylbenzene to α-methyl styrene, ethylcyclohexane to styrene, cyclohexane to benzene, methane to ethylene and acetylene, ethane to ethylene to acetylene, propane to propylene or methyl acetylene, allene, or benzene, isobutane to isobutylene, n-butane to butene and butadiene-1,3, butene to butadiene-1,3 and vinyl acetylene, methyl butene to isoprene, cyclopentane to cyclopentene and cyclopentadiene-1,3, n-octane to ethyl benzene and orthoxylene, monomethylheptanes to xylenes, propane to propylene to benzene, ethyl acetate to vinyl acetate, 2,4,4-trimethylpentane to xylenes, and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3 dichlorobutane, 1,4 dichlorobutane, the chlorofluorethanes, methyl pentane, methylethyl ketone, diethyl ketone, n-butyl alcohol, methyl propionate, and the like.

Suitable dehydrogenation reactions include the following: acyclic compounds having 4 to 5 non-quaternary contiguous carbon atoms to the corresponding olefins, diolefins or acetylenes having the same number of carbon atoms; aliphatic hydrocarbons having 6 to 16 carbon atoms and at least one quarternary carbon atom to aromatic compounds, such as 2,4,4-trimethylpentene-1 to a mixture of xylenes; acrylic compounds having 6 to 16 carbon atoms and no quarternary carbon atoms to aromatic compounds such as n-hexane or the n-hexanes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic and unsaturated side chain such as ethyl benzene to styrene.

The preferred compounds to be dehydrogenated are hydrocarbons, with particular preferred feedstocks being acyclic non-quarternary hydrocarbons having 4 to 5 contiguous carbon atoms and ethyl benzene. The preferred products are n-butene-1 or 2, butadiene-1,3, vinyl acetylene, 2-methyl-1-butene, 3-methyl-1-butene, 3-methyl-2-butene, isoprene, styrene or mixtures thereof. Especially preferred as feed are n-butene-1 or 2, the methyl butenes, and mixtures thereof, such as hydrocarbon mixtures containing these compounds in at least 50 mol percent.

The organic compound to be dehydrogenated is contacted with oxygen in order for the oxygen to oxidatively dehydrogenate the compound. The oxygen may be supplied to the organic compound from any suitable source

---

[2] The powder diffraction patterns may be made, e.g., with a Norelco constant potential diffraction unit type No. 12215/0 equipped with a wide range goniometer type No. 42273/0 cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1160 volts and the pulse height analyzer is set to accept pulses with amplitudes between 10 and 30 volts only. Slits used are divergence 1°, receiving .006 inches and scatter 1°. Strip chart recordings for identification are made with a scanning speed of ¼° per minute, time constant of 4 seconds and a full scale of $10^3$ counts per second. No correction is made of $K^\alpha$ doublet or instrumental broadening of the band widths.

as by feeding oxygen to a dehydrogenation zone for example as disclosed in U.S. 3,207,810 issued Sept. 21, 1965. Oxygen may be fed to the reactor as pure oxygen, as air, as oxygen-enriched air, oxygen mixed with diluents, and so forth. Oxygen may also be supplied by means of a transport or moving oxidant type of process such as disclosed in U.S. 3,050,572 issued Aug. 21, 1962 or U.S. 3,118,007 issued Jan. 14, 1964 in which case the catalysts of this invention can partially or completely furnish the oxygen and therefore the catalysts could be referred to as an oxidant or oxygen carrier. Oxygen may be supplied partially by a solid oxidant and partially by gaseous oxygen. Oxygen may also be added in increments to the dehydrogenation zone. Oxygen may also be supplied by the release of oxygen from oxygen releasing compounds which are in gas phase in the dehydrogenation zone. Although determinations regarding the mechanism of reaction are difficult, the process of this invention is an oxidation dehydrogenation process wherein the predominant mechanism of dehydrogenation is by the reaction of oxygen with hydrogen and preferably at least 85 or 90 mol percent of the hydrogen atoms removed are by this reaction.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g., air to the reactor or solid oxidant to the reactor) in the dehydrogenation zone in an amount from about 0.2 to 1.5, preferably 0.3 to 1.2 mols per mol of $H_2$ being liberated from the organic compound. Ordinarily the mols of oxygen supplied will be in the range of from .2 to 2.0 mols per mol of organic compound to be dehydrogenated and for most dehydrogenations this will be within the range of .25 to 1.5 mols of oxygen per mol of organic compound.

Preferably, the reaction mixture contains a quantity of steam or diluent such as nitrogen with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. The functions of the steam are several-fold, and the steam may not merely act as a diluent. Diluents generally may be used in the same quantities as specified for the steam. These gases serve also to reduce the partial pressure of the organic compound.

The dehydrogenation may be conducted in the presence or absence of halogens, as desired. In general, however, the presence of halogen gives improved results. If utilized, the halogens are those selected from the group consisting of chlorine, bromine, and iodine and mixtures thereof. They may be employed as free halogen or as any halogen containing material which liberates the required amount of free halogen under the conditions of reaction as defined hereinafter. For example, chlorine, bromine, iodine, hydrogen chloride, hydrogen iodide, hydrogen bromide, the alkyl halides, such as methyl chloride, methyl bromide, ethyl chloride, bromide, and iodide, wherein the alkyl groups preferably contain 1 to 6 carbon atoms; and inorganic halides such as ammonium bromide, chloride and the like are suitable. Additional halogen compounds are the chlorohydrins and bromohydrins such as ethylene chlorohydrin and ethylene bromohydrin, halo-substituted aliphatic acids such as chloroacetic and bromoacetic acid; organic amine halogen salts such as methyl amine hydrobromide, hydrochloride, and hydroiodide; and other halide compounds such as $SCl_4$, $SBr_4$, $SI_4$, $CH_2Cl_2$, $CH_2Cl_3$, $CCl_4$, $CHBr_3$, $CBr_4$, and the like. Although not critical, the halogen compound will generally have a boiling or decomposition point of less than 400° C. and usually no greater than 100° C. Preferred are ammonium halides, molecular or elemental halogens, and/or hydrogen halides, such as HCl, HBr, HI. It is an advantage of this invention that hydrogen halides or ammonium halides may be employed as the halogen source, where the use of halogen is desired, with one advantage being that the hydrogen halide or ammonium halide in the effluent from the reactor may be fed directly back to contact the hydrocarbons in the dehydrogenation reactor without any necessity of converting the hydrogen halide to the halogen. It is understood that when a quantity of halogen is referred to herein, both in the specification and the claims that this refers to the calculated quantity of halogen in all forms present in the vapor space under the conditions of reaction regardless of the initial source or the form in which the halogen is present. For example, a reference to 0.05 mol of bromine would refer to the quantity of bromine present whether the bromine was fed as 0.05 mol of $Br_2$ or 0.10 mol of HBr.

Where employed, the amount of halogen usually will be in an amount of about or greater than about 0.0001 mol of halogen, such as at least 0.001 mol, or the equivalent amount of halogen-liberating material per mol of organic compound to be dehydrogenated. Normally, at least about 0.01 mol equivalent of halogen per mol of organic compound will be employed. Large amounts of halogen may be used, as high as one-half to one mol or more per mol of organic compound to be dehydrogenated, but it is one of the unexpected advantages of this invention that only very small amounts of halogen are required, normally less than about 0.2 mol total equivalent of halogen and more desirably less than 0.1 mol of halogen per mol of organic compound to be dehydrogenated. Amounts of halogen between 0.001 or 0.005 and 0.08 or 0.09 mol of halogen per mol of the organic compound to be dehydrogenated are preferred, with the range of about 0.01 to 0.05 being particularly preferred. Preferably the halogen will be present in an amount no greater than 5 or 10 mol percent of the total feed to the dehydrogenation zone. The temperature for the dehydrogenation reaction generally will be at least about 250° C., such as greater than about 300° C. or 375° C., and the maximum temperature in the reactor may be about 700° C. or 800° C., or perhaps as high as 900° C. under certain circumstances. However, excellent results are obtained within the range of or about 350° C. to 700° C., such as from or about 400° C. to or about 675° C. The temperatures are measured at the maximum temperature in the dehydrogenation zone. An advantage of this invention is that lower temperatures of dehydrogenation may be utilized than are possible in conventional dehydrogenation processes. Another advantage is that large quantities of heat do not have to be added to the reaction.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally the flow rates will be within the range of about 0.10 to 25 liquid volumes of the organic compound to be dehydrogenated per volume of dehydrogenation zone containing catalyst per hour (referred to as LHSV). Usually, the LHSV will be between 0.15 and about 5 or 10. For calculation, the volume of a fixed bed dehydrogenation zone containing catalyst is that original void volume of reactor space containing catalyst. When a solid oxidant is employed, the dehydrogenation zone is calculated from the point of contact of the compound to be dehydrogenated to the entrance to the separator to separate oxidant from dehydrogenated compound. The gaseous hourly space velocity (GHSV) is the volume of the organic compound to be dehydrogenated in the form of vapor calculated under standard conditions of 0° C. and 760 mm. of mercury per volume of reactor space containing catalyst per hour. Generally, the GHSV will be between about 25 and 6400, and excellent results have been obtained between about 38 and 3800. Suitable contact times in the dehydrogenation zone are, for example, from about 0.001 or higher to about 4 or 10 or 25 seconds, with particularly good results being obtained between 0.01 and 2 or 5 seconds. The contact time is the calculated dwell time of the reaction mixture in the dehydrogenation zone, assuming the mols of product mixture are equivalent to the mols of feed mixture.

Excellent results may be obtained by packing the reactor with catalyst particles as the method of introducing the catalytic surface. The size of the catalyst particles may vary widely but generally the maximum particles size should at least pass through a Tyler Standard Screen which has an opening of 2 inches, and generally the largest particles of catalyst should pass through a Tyler Screen with one inch openings. Thus, the particle size when particles are used preferably will be from about 10 microns to a particle size which will pass through a Tyler Screen with openings of 2 inches. If a carrier is used the catalyst may be deposited on the carrier by methods known in the art such as by preparing an aqueous solution or dispersion of the catalyst, mixing the carrier with the solution or dispersion until the active ingredients are coated on the carrier. The coated particles may then be dried, for example, in an oven at about 110° C. Various other methods of catalyst preparation known to those skilled in the art may be used. Very useful carriers are the Alundums, silicon carbide, the Carborundums, pumice, kieselguhr, asbestos, and the like. When carriers are used, the amount of catalyst composition on the carrier will generally be in the range of about 2 to 80 weight percent of the total weight of the active catalytic material plus carrier. Another method for introducing the required surface is to utilize as a reactor a small diameter tube wherein the tube wall is catalytic or is coated with catalytic material. If the tube wall is the only source of catalyst generally the tube will be of an internal diameter of no greater than one inch such as less than ¾ inch in diameter or preferably will be no greater than about ½ inch in diameter. The technique of utilizing fluid beds lends itself well to the process of this invention.

The catalyst compositions of this invention may also comprise additives. Phosphorus, silicon or mixtures thereof are examples of additives. For instance, phosphorus and/or silicon may suitably be present in an amount of from about 0.1 to 30 weight percent, preferably .2 to 20 percent, based on the total weight of the defined metal atoms of the catalyst. These ingredients may contribute e.g. to the stability of the compositions. The silicon, phosphorus or other additives may be added at various stages of the preparation of the composition, or may be added to the already formed catalyst. Any suitable compounds may be employed such as phosphoric acid, phosphorus pentoxide, ethyl phosphate, ammonium phosphate, silicon halides, etc.

In the above descriptions of catalyst compositions, the composition described is that of the surface which is exposed in the dehydrogenation zone to the reactants. That is, if a catalyst carrier is used, the composition described as the catalyst refers to the composition of the surface and not to the total composition of the surface coating plus carrier. Catalyst binding agents or fillers may be used, but these will not ordinarily exceed about 50 percent or 65 percent by weight of the catalytic surface. The defined catalytic components will be the main active constituents in the catalyst and the catalyst may consist essentially of the defined catalytic components. The weight percent of the defined catalytic atoms will generally be at least 20 percent, and are preferably at least 35 percent of the composition of the catalyst surface exposed to the reaction gases and will generally be at least 51 or about 80 atomic weight percent of any cations in the surface, such as at least 80 atomic percent of any metal cations in the surface.

The defined catalyst combinations may be employed in any form, e.g., as pellets, tablets, as coatings on carriers or supports, and the like, in both fixed and fluidized beds. Other methods of catalyst preparation known to those skilled in the art may also be used.

To demonstrate the preparation of these catalysts and their use in the process of the invention, the following non-limiting examples are set forth.

Examples I and II demonstrate preparation of exemplary catalysts, and it will be recognized by those skilled in the art that similar catalysts falling within the scope of the invention may be prepared in like manner. The conversions, selectivities and yields in Examples III to XV are expressed as mol percent based on the mols of the compound to be dehydrogenated fed to the reactor. The temperature of reaction listed is approximately the maximum temperature in the reactor, and the catalysts are present as fixed beds.

EXAMPLE I

A catalyst having the formula $La_{0.7}Ca_{0.3}MnO_3$ was prepared as follows. One hundred thirty grams (130 g.) of lanthanum oxide, 46 grams of manganous carbonate, and 22.4 grams of calcium oxide were slurried with 250 cc. of demineralized water for thirty minutes in a one quart Waring blender. The resulting slurry was dried in an oven overnight, crushed and ball-milled for thirty minutes, and then calcined for four hours at 850° C. The product was then re-milled for two hours, and sintered at 850° C. for an additional 11 hours.

EXAMPLE II

A catalyst having the formula $La_{0.4}Bi_{0.3}Ca_{0.3}Mn_{1.0}O_3$ was prepared as follows: Sixty-five and two-tenths grams (65.2 grams) of lanthanum oxide, 125.8 grams of manganous carbonate, 16.8 grams of calcium oxide, and 70.6 grams of bismuth trioxide were slurried was 250 cc. of demineralized water for about thirty minutes in a one quart Waring Blender. The slurry was dried, crushed, ball-milled for one hour, and then calcined at 850° C. for 3 hours. The product was then re-milled for 15 hours and re-calcined at 850° C. for an additional 8 hours.

EXAMPLE III

The reactor consists of two, 23½ inch electric multiple-unit, tube type (hinged) combustion furnaces mounted vertically one over the other about three inches apart. Each furnace houses a 24 x 1 inch I.D. 316 stainless steel tube and the tubes are connected to each other at a location between the furnaces. The top tube contains 6 x 6 mm. Vycor Raschig rings and is used to vaporize, mix and preheat the reactants before they pass downflow, over the catalyst bed (125 cc. of catalyst) contained in the bottom tube. The inlet temperature to the bed and outlet temperature are measured by suitable thermocouples.

In this example, butane, steam and oxygen were fed at a liquid hourly space velocity (LHSV) of 1.0 into the reactor at an inlet temperature of 800° F. and the catalyst was the composition $La_{0.4}Bi_{0.3}Ca_{0.3}Mn_{1.0}O_3$. The ratio of $O_2$ to hydrocarbon was kept at about 1.2, while the ratio of steam to hydrocarbon was maintained at 15.0. Analysis of the effluent indicated a dehydrogenation rate of greater than 25 percent per pass.

EXAMPLE IV

Butylenes (a mixture of butene-1 and butene-2) were fed at a LHSV of 1.0 into the reactor of Example III which contained a catalyst of the composition as set forth in Example III. The inlet temperature of the bed of the reactor was held at 760° C., the ratio of $O_2$ to hydrocarbon was kept at about 0.6 and the ratio of steam to hydrocarbon was about 15.0. The product effluent showed a selectivity of 89.1 percent to butadiene 1–3.

In Examples V through XI a 14 inch combustion furnace having a 12 inch heat zone (4 inches of pre-heat zone and 8 inches of reaction zone—each capable of independent temperature control) was used. A conventional Vycor (1 inch I.D.) tube reactor with coaxial thermowell was used to contain the catalyst in the furnace. All reactants were passed down-flow over about a 4 inch depth of Vycor Raschig rings contained in the upper pre-heat section of the furnace and then over the catalyst contained in the lower 8 inch section of the furnace. Results of catalytic activity were determined by chromatographic analysis of the products of the reaction collected directly from the exit end of the reactor.

EXAMPLE V

N-butane, steam and oxygen are fed at a LHSV of 1.0 into the reactor at an inlet temperature of 625° C. The catalyst is a composition having the formula $$La_{0.7}Ca_{0.3}MnO_3$$

The oxygen is fed as air in a ratio of 1.2 mols oxygen per mol of hydrocarbon, while the ratio of steam to hydrocarbon is maintained at 15.0. Bromine ($Br_2$) is fed into the reactor in a ratio of 0.08 mol bromine per mol hydrocarbon. On analysis the effluent discloses a conversion rate of greater than 67.7 percent with a selectivity to butadiene of 59.6 percent and a selectivity to butenes of about 8.5 percent.

EXAMPLE VI

A mixture of butenes is fed at a LHSV of 1.0 into the reactor containing a catalyst of the composition set forth in Example V. The inlet temperature of the reactor is held at 650° C., the ratio of oxygen to hydrocarbon is kept at about 0.8, and the ratio of steam to hydrocarbon is about 15.0. Bromine ($Br_2$) is added in a ratio of 0.08 mol bromine per mol hydrocarbon. Examination of the effluent shows a conversion rate of 83.6 percent with a selectivity of 91.8 percent to butadiene 1,3.

EXAMPLE VII

N-butane, steam and oxygen are fed at a LHSV of 1.0 into the reactor at an inlet temperature of 550° C. The catalyst is a composition of the formula $La_{0.7}Ba_{0.3}MnO_3$. The ratio of oxygen to hydrocarbon is 1.2 while the ratio of steam to hydrocarbon is 15.0. Bromine is fed at 0.08 mol bromine per mol of hydrocarbon. The effluent indicates a conversion rate of 48.2 percent with a selectivity of 61.2 percent to butadiene 1,3 and 14.3 percent to butenes.

EXAMPLE VIII

N-butylenes are fed at a LHSV of 1.0 into the reactor which contains a catalyst of the composition set forth in Example VII. In this example the inlet temperature of the reactor is about 600° C., the ratio of oxygen to hydrocarbon is 0.7, the ratio of steam to hydrocarbon is about 15.0, and the ratio of bromine to hydrocarbon is 0.08. The effluent indicates a conversion rate of 76.0 percent with a selectivity of 94.6 to butadiene 1,3.

EXAMPLES IX AND X

Examples VII and VIII are repeated using a catalyst having the composition $La_{0.7}Sr_{0.3}MnO_3$. In both instances good conversion rates and good selectivity are obtained.

EXAMPLE XI

Example VIII is repeated using chlorine instead of bromine. Good yields are obtained.

EXAMPLE XII

N-butane, steam and oxygen are fed at an LHSV of 1.0 into the reactor of Example III at an inlet temperature of 800° F. The catalyst has the composition $La_{0.7}Ca_{0.3}Mn_{0.5}V_{0.5}O_3$. The ratio of oxygen to hydrocarbon is 1.2, while the ratio of steam to hydrocarbon is 15.0. Bromine is fed at a ratio of 0.08 mol bromine per mol of hydrocarbon. Good conversion with high selectivity to butadiene-1,3 is obtained.

EXAMPLE XIII

The procedure of Example XII is repeated using a catalyst comprising $La_{0.4}Ce_{0.3}Ca_{0.3}Mn_{1.0}O_3$. Good conversion and selectivity to butadiene 1,3 are obtained.

EXAMPLE XIV

The procedure of Example XII is repeated using $Y_{0.3}La_{0.4}Ca_{0.3}Mn_{1.0}O_3$ and an inlet temperature of 820° F. Good conversion and selectivity to butadiene 1,3 are obtained.

EXAMPLE XV

Isopentane, steam and oxygen (as air) are fed at an LHSV of about 1.0 into the reactor of Example III at an inlet temperature of about 810° F. The catalyst is of the composition $La_{0.4}Ce_{0.3}Ca_{0.3}Mn_{1.0}O_3$. The ratio of $O_2$ to hydrocarbon is maintained at about 1.2, while the ratio of steam to hydrocarbon is about 15.0. Bromine ($Br_2$) is supplied at a ratio of 0.08 mol per mol of hydrocarbon. Good conversion and selectivity to isoprene are obtained.

The invention claimed is:

1. A method for the dehydrogenation of hydrocarbon compounds containing at least one

having 4 to 8 carbon atoms and at least 4 contiguous non-quarternary carbon atoms to produce an unsaturated compound by the dehydrogenation of said

group and the formation of an unsaturated group, said method comprising heating said compound with oxygen in the vapor phase at an elevated temperature in the presence of a solid catalyst comprising a composition of the perovskite type crystalline structure having the formula $Me_{(1-x)}Q_xMn_{(1-r)}A_rO_y$ wherein Me is a metal selected from the group consisting of La, Ce, Y, Co, Bi and mixtures thereof, Q is a cation selected from the group consisting of Ca, Sr, Ba, and mixtures thereof, A is a metal selected from the group consisting of Co, V, Cr, Ti, Nb, Ta, Zr, and mixtures thereof, x is a number between 0.05 and 0.55, r is a number between 0 and 0.50 and y is a number from 3 to 6.

2. The process of claim 1 wherein the temperature is greater than 400° C.

3. The process of claim 1 wherein the atomic ratio of the total of Me and Q to Mn is about 0.8 to 2:1.

4. The process of claim 1 wherein a halogen selected from the group consisting of chlorine, bromine, iodine, and mixtures thereof is present during the reaction.

5. The process of claim 4, wherein the atomic ratio of the total of Me and Q to Mn is about 0.8 to 2:1.

6. The process of claim 5 wherein the halogen utilized is present in an amount of about or greater than about 0.001 mol of halogen per mol of hydrocarbon.

7. The process of claim 1 wherein A is vanadium.

8. The process of claim 1 wherein Me is lanthanum.

9. The process of claim 8 wherein Q is barium.
10. The process of claim 8 wherein Q is strontium.

References Cited
UNITED STATES PATENTS

| | | | |
|---|---|---|---|
| 3,308,187 | 3/1967 | Bajars | 260—680 |
| 3,308,192 | 3/1967 | Bajars | 260—680 |
| 3,308,199 | 3/1967 | Bajars | 260—680 |
| 3,494,972 | 2/1970 | Friedli | 260—680 |
| 3,607,966 | 9/1971 | Croce et al. | 260—680 |
| 3,257,474 | 6/1966 | Callahan et al. | 260—680 |
| 3,322,849 | 5/1967 | McEuen | 260—683.3 |
| 3,380,931 | 4/1968 | Ryland | 260—680 X |

PAUL M. COUGHLAN, Jr., Primary Examiner

U.S. Cl. X.R.

252—471; 260—680 E, 683.3

PO-1050
(5/69)

UNITED STATES PATENT OFFICE
CERTIFICATE OF CORRECTION

Patent No. __3,780,126__  Dated __Dec. 18, 1973__

Inventor(s) __Harold E. Manning__

It is certified that error appears in the above-identified patent and that said Letters Patent are hereby corrected as shown below:

Line 60, col. 1 reads "crystalline composition" but should read ---crystalline compositions---.

Line 1, col. 2 reads "$La_0 Sr_{0.3}MnO_3$" but should read ---$La_{0.7}Sr_{0.3}MnO_3$---.

Line 58, col. 2 reads "catalytic cavity" but should read ---catalytic activity---.

Line 35, col. 3 reads "substiuting" but should read ---substituting---.

Line 54, col. 10 reads "Oy" but should read ---$O_y$---.

Signed and sealed this 29th day of October 1974.

(SEAL)
Attest:

McCOY M. GIBSON JR.
Attesting Officer

C. MARSHALL DANN
Commissioner of Patents